United States Patent
Cui et al.

(10) Patent No.: US 11,671,660 B2
(45) Date of Patent: *Jun. 6, 2023

(54) CLUSTERING TELEVISION PROGRAMS BASED ON VIEWING BEHAVIOR

(71) Applicant: The Nielsen Company (US), LLC, New York, NY (US)

(72) Inventors: Jingsong Cui, Pennington, NJ (US); Scott John Sereday, Rochelle Park, NJ (US); Xiaoting Liang, Hoboken, NJ (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/360,822

(22) Filed: Jun. 28, 2021

(65) Prior Publication Data

US 2021/0329336 A1    Oct. 21, 2021

Related U.S. Application Data

(63) Continuation of application No. 16/555,871, filed on Aug. 29, 2019, now Pat. No. 11,051,070, which is a
(Continued)

(51) Int. Cl.
*H04N 21/442* (2011.01)
*H04N 21/258* (2011.01)
*G06Q 30/00* (2023.01)

(52) U.S. Cl.
CPC ....... *H04N 21/44222* (2013.01); *G06Q 30/00* (2013.01); *H04N 21/25891* (2013.01); *H04N 21/44204* (2013.01)

(58) Field of Classification Search
CPC ............. G06Q 30/00; H04N 21/25891; H04N 21/44204; H04N 21/44222
See application file for complete search history.

(56) References Cited

U.S. PATENT DOCUMENTS 9,277,264 B2    3/2016  Bentolila et al.
9,311,383 B1    4/2016  Karty et al.
(Continued)

FOREIGN PATENT DOCUMENTS

WO    2014143729    9/2014

OTHER PUBLICATIONS

United States Patent and Trademark Office, "Notice of Allowance," mailed in connection with U.S. Appl. No. 15/799,636, dated Apr. 24, 2019, 9 pages.
(Continued)

*Primary Examiner* — Rong Le
(74) *Attorney, Agent, or Firm* — Hanley, Flight & Zimmerman, LLC

(57) ABSTRACT

Example apparatus disclosed herein are to compare (i) ratios of program ratings to corresponding network ratings with (ii) a threshold to determine adjusted viewing data for respective sites during a monitoring interval, the program ratings and the corresponding network ratings determined for programs tuned on corresponding networks at the respective sites during the monitoring interval, the adjusted viewing data for a combination of a first program and a first site to represent an adjusted amount of time the first program was presented at the first site. Disclosed example apparatus are also to cluster the programs into program clusters based on distances between respective combinations of pairs of the programs, the distances based on the adjusted viewing data. Disclosed example apparatus are further to output information to identify the program clusters.

18 Claims, 4 Drawing Sheets

Related U.S. Application Data continuation of application No. 15/799,636, filed on Oct. 31, 2017, now Pat. No. 10,405,040.

(60) Provisional application No. 62/424,201, filed on Nov. 18, 2016.

(56) References Cited

U.S. PATENT DOCUMENTS

| | | |
|---|---|---|
| 9,589,045 B2 | 3/2017 | Levitan et al. |
| 2003/0067554 A1 | 4/2003 | Klarfeld et al. |
| 2003/0093792 A1 | 5/2003 | Labeeb et al. |
| 2003/0101449 A1 | 5/2003 | Bentolila et al. |
| 2003/0101451 A1 | 5/2003 | Bentolila et al. |
| 2004/0001081 A1 | 1/2004 | Marsh |
| 2006/0212904 A1 | 9/2006 | Klarfeld et al. |
| 2011/0060738 A1 | 3/2011 | Gates et al. |
| 2013/0166561 A1 | 6/2013 | Georgescu et al. |
| 2015/0089523 A1 | 3/2015 | Volovich et al. |
| 2018/0146250 A1 | 5/2018 | Cui et al. |
| 2019/0387274 A1 | 12/2019 | Cui et al. |

OTHER PUBLICATIONS

United States Patent and Trademark Office, "Non-final Office Action," mailed in connection with U.S. Appl. No. 15/799,636, dated Dec. 13, 2018, 11 pages.

United States Patent and Trademark Office, "Notice of Allowance," mailed in connection with U.S. Appl. No. 16/555,871, dated Feb. 24, 2021, 8 pages.

United States Patent and Trademark Office, "Non-final Office Action," mailed in connection with U.S. Appl. No. 16/555,871, dated Oct. 28, 2020, 8 pages.

CLUSTERING TELEVISION PROGRAMS BASED ON VIEWING BEHAVIOR

RELATED APPLICATION(S)

This patent arises from a continuation of U.S. patent application Ser. No. 16/555,871 (now U.S. Pat. No. 11,051,070), which is titled "CLUSTERING TELEVISION PROGRAMS BASED ON VIEWING BEHAVIOR," and which was filed on Aug. 29, 2019, which is a continuation of U.S. patent application Ser. No. 15/799,636 (now U.S. Pat. No. 10,405,040), which is titled "CLUSTERING TELEVISION PROGRAMS BASED ON VIEWING BEHAVIOR," and which was filed on Oct. 31, 2017, which claims the benefit of and priority to U.S. Provisional Application No. 62/424,201, which is titled "CLUSTERING TELEVISION PROGRAMS BASED ON VIEWING BEHAVIOR," and which was filed on Nov. 18, 2016. Priority to U.S. Provisional Application No. 62/424,201, U.S. patent application Ser. No. 15/799,636 and U.S. patent application Ser. No. 16/555,871 is claimed. U.S. Provisional Application No. 62/424,201, U.S. patent application Ser. No. 15/799,636 and U.S. patent application Ser. No. 16/555,871 are hereby incorporated by reference herein in their respective entireties.

FIELD OF THE DISCLOSURE

This disclosure relates generally to television program monitoring and, more particularly, to clustering television programs based on viewing behavior.

BACKGROUND

Program clustering analysis provides strategic insights to television content providers, advertisers, broadcasters, etc. For example, program clustering analysis can provide insight into what types of television programs given viewers typically watch, what other television programs are competing with a given television program, what television program segments and genres are over-crowded, whether there is any white space where a content provider can introduce new content to increase growth, etc.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
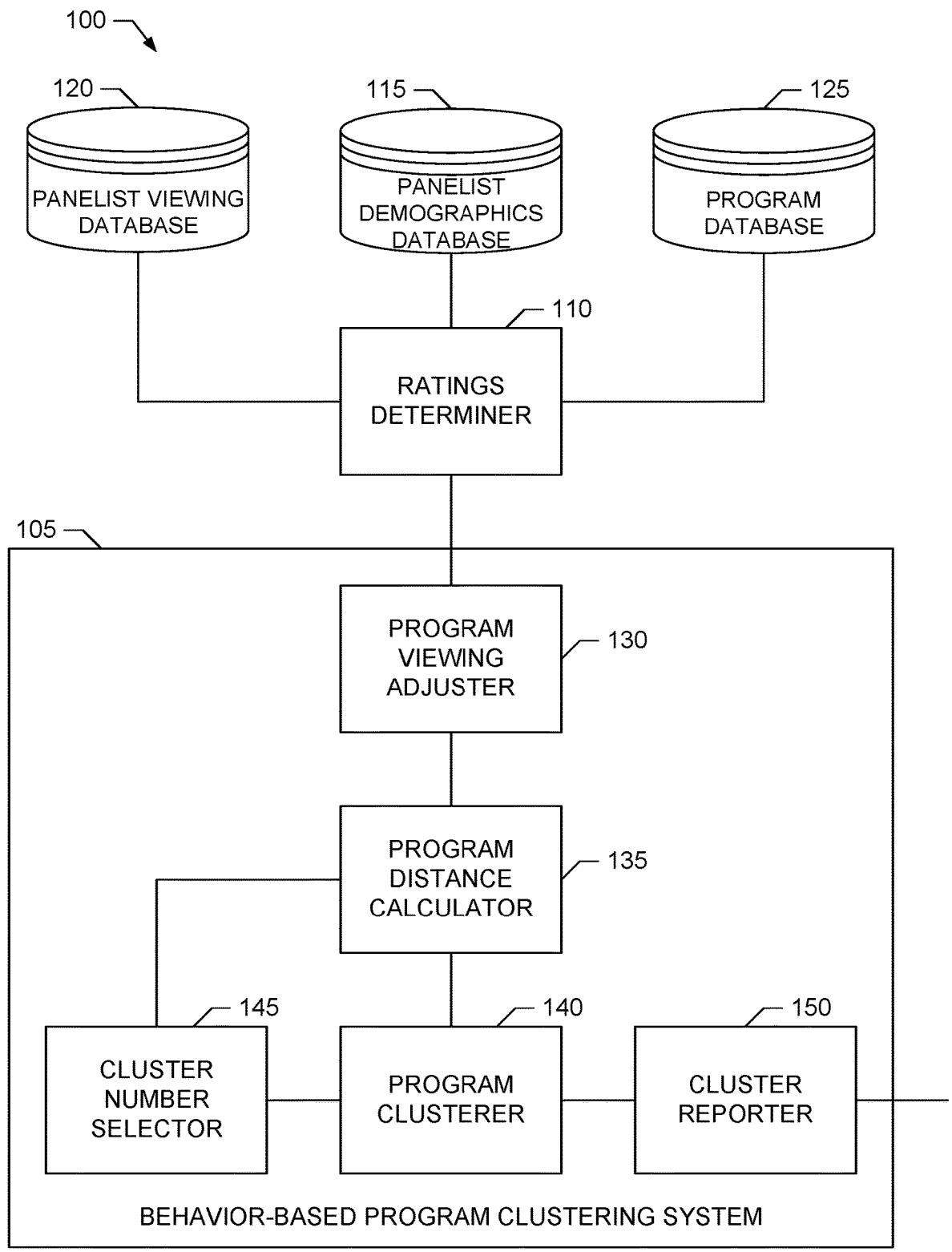
FIG. 1 is a block diagram of an example audience measurement system including an example behavior-based program clustering system implemented in accordance with the teachings of this disclosure.

Methods, apparatus, systems and articles of manufacture (e.g., non-transitory physical storage media) to cluster television programs based on viewing behavior are disclosed herein. Example program clustering methods disclosed herein include accessing respective person-level program viewing data representing lengths of time respective people in an audience have tuned to respective ones of a plurality of television programs to be clustered. Disclosed example program clustering methods also include determining adjusted person-level program viewing data for respective ones of the people having tuned to respective ones of the television programs. For example, first person-level program viewing data for a first one of the people having tuned to a first one of the programs is adjusted based on a first ratio characterizing a relationship between a first program rating associated with the first one of the people having tuned to the first one of the programs and a first network rating associated with the first one of the people having tuned to a first network associated with the first one of the programs. Disclosed example program clustering methods further include clustering the ones of the plurality of television programs into clusters based on distances between pairs of the television programs, the distances being based on the adjusted person-level program viewing data. In some examples, the number of clusters into which the television programs are to be clustered is determined based on average silhouette width, which is described in further detail below.

In some disclosed example methods, the first program rating corresponds to a fraction of time, relative to a total duration of the first one of the programs, during which the first one of the people tuned to the first one of the programs. Additionally or alternatively, in some disclosed example methods, the first network rating corresponds to a fraction of time, relative to a monitoring interval, during which the first one of the people tuned to the first network. Additionally or alternatively, some such disclosed example methods further include determining the first ratio by determining a numerator value based on a difference between the first program rating and the first network rating, determining a denominator value based on the first network rating and the total duration of the first one of the programs, and dividing the numerator value by the denominator value to determine the first ratio.

Additionally or alternatively, in some such disclosed example methods, the determining of the adjusted person-level program viewing data includes adjusting the first person-level program viewing data for the first one of the people having tuned to the first one of the programs by comparing the first ratio to a threshold, setting the first person-level program viewing data equal to zero when the ratio does not satisfy the threshold, and leaving the first person-level program viewing data unchanged when the ratio satisfies the threshold. For example, the threshold may be satisfied when the ratio exceeds the threshold, and the threshold may not be satisfied when the ratio does not exceed the threshold.

Additionally or alternatively, some such disclosed example methods also include selecting a final number of clusters into which the plurality of television programs is to be clustered. For example, such selecting can be based on determining average silhouette width values for clustering the plurality of television programs into different possible numbers of clusters. Furthermore, in some such disclosed examples, an average silhouette width value is determined for clustering the plurality of television programs into a first possible number of clusters by computing silhouette width values for respective ones of the plurality of television programs when the television programs are clustered into the first possible number of clusters. For example, a silhouette width value for a first one of the television programs can be based on (1) an average distance of the first one of the television programs to other television programs in a same first cluster as the first one of the television programs, and (2) an average distance of the first one of the television programs to a neighboring cluster of the first cluster. Some such disclosed examples also include averaging the silhouette width values for the respective ones of the plurality of television programs when the television programs are clustered into the first possible number of clusters to determine the average silhouette width value for clustering the plurality of television programs into the first possible number of clusters.

These and other example methods, apparatus, systems and articles of manufacture (e.g., non-transitory physical storage media) to cluster television programs based on viewing behavior are disclosed in further detail below.

As noted above, program clustering analysis provides strategic insights to television content providers, advertisers, broadcasters, etc. For example, program clustering analysis can provide insight into what types of television programs given viewers typically watch, what other television programs are competing with a given television program, what television program segments and genres are over-crowded, whether there is any white space where a content provide can introduce new content to increase growth, etc. Prior program clustering approaches for genre research are based upon the content providers' own inputs. These approaches have several limitations. For example, such prior approaches lack consistent standards and definitions across content providers, which may result in programs that are in the same genre from a viewer's perspective being treated as belonging to different genres from a content provider's perspective. Such prior approaches may also result in program clustering that lacks transparency and is subjective, and may not scale well across many programs and television networks.

Unlike such prior program clustering approaches, television program clustering as disclosed herein is based on viewing behavior. For example, behavior-based program clustering, as disclosed herein, processes person-level viewing data (e.g., obtained from an audience measurement system) with unique and advanced statistical techniques to provide a behavior-based program clustering solution that creates meaningful and behaviorally-driven program clusters. This solution can provide insight based upon how programs are actually viewed by people, instead of how they are assigned to subjective genre groups by content providers.

Turning to the figures, a block diagram of an example audience measurement system 100 including an example behavior-based program clustering system 105 to cluster television programs based on viewing behavior in accordance with the teachings of this disclosure is illustrated in FIG. 1. The audience measurement system 100 includes an example ratings determiner 110 to determine television ratings data including person-level viewing data based on data obtained by the audience measurement system 100 and stored in one or more of an example panelist demographics database 115, an example panelist viewing database 120 and/or an example program database 125.

In the illustrated example, the panelist demographics database 115 includes demographic information, such as age, gender, location, income, education, etc., associated with panelists of statistically selected panelist monitoring sites (e.g., households) included in an audience measurement panel, such as a national people meter panel managed by The Nielsen Company (US), LLC. The panelist viewing database 120 of the illustrated example includes panelist measurement data obtained from the statistically selected panelist monitoring sites (e.g., households). Such panelist measurement data includes, for example, panelist level viewing data identifying the television programs presented (e.g., tuned) at the statistically selected panelist monitoring sites and their respective durations, or lengths of time, of presentation. For example, the panelist viewing database 120 can include All-Minute Respondent Level Data (AMRLD) obtained from monitoring the national people meter panel managed by The Nielsen Company (US), LLC. Additionally or alternatively, in some examples, the panelist viewing database 120 includes census measurement data typically obtained from a much larger audience than the panelist measurement data, such as via set-top box return path data corresponding to subscribers of one or more cable service providers, satellite service providers, etc. Such census measurement data includes, for example, respondent level viewing data identifying the television programs presented at each reporting site and their respective durations of presentation, but may not include demographic information associated with the respondents. The program database 125 includes details concerning the programs that may be monitored by the audience measurement system 100, such as program and episode identification information, program durations, etc.

The ratings determiner 110 of the illustrated example uses any appropriate ratings determination technique or combination of techniques to determine person-level viewing data based on the data available in the panelist viewing database 120, the panelist demographics database 115 and/or the program database 125. The person-level viewing data determined by the ratings determiner 110 identifies, for an individual person and over a measurement time interval, the television programs selected (e.g., tuned) by the person, the times (e.g., lengths of time) over which those television programs were presented, the networks selected (e.g., tuned) by the person, the times (e.g., lengths of time) over which those networks were presented, etc. Such person-level viewing data may have one or more of the following characteristics: a skewed distribution, sparsity and/or network effect.

Person-level viewing data may have a skewed distribution because relatively few popular programs typically account for most of the viewing minutes. As a result, a majority of the programs (e.g., ~75%) may have respective ratings of less than a quarter of a percent. Also, viewing minutes by person may be skewed when a small proportion of the viewers account for most of the television viewing.

Additionally or alternatively, person-level viewing data may exhibit sparsity. The television program universe typically consists of several thousand programs (e.g., 2-3 thousand programs). However, each person can view only a small portion of all the programs. Therefore, most of the person level viewing data (e.g., person-program pairs) is missing (e.g., or represented by zeros).

Additionally or alternatively, person-level viewing data may exhibit a network effect. There may be a significant correlation between viewings of different programs on the same network. This relationship is referred to as the "network effect," which represents viewer behavior in which viewers are seemingly making program decisions based upon the network and not just based on a given program's characteristics.

The example behavior-based program clustering system 105 processes the person-level viewing data determined by the ratings determiner 110 to cluster television programs based in viewer behavior data in a manner that addresses one or more, or all, of the foregoing characteristics of the person-level viewing data. For example, to address the skewed distribution and sparsity characteristics, the behavior-based program clustering system 105 may access the program database 125 to identify television programs for clustering that are prime time programs broadcast over a recent time period (e.g., 6 months or some other time period) and for which the programs had 4 or more telecasts. The behavior-based program clustering system 105 may also exclude generic movie programs (e.g., "Saturday Night Movies") and/or exclude programs with low ratings (e.g., <0.01 rating share). Other qualifications/filters may additionally or alternatively be used as clustering criteria to identify the television programs, audience population, time period, etc., to set the scope for the program clustering. The behavior-based program clustering system 105 may then limit clustering to only those identified television programs satisfying the clustering criteria for the identified audience population satisfying the clustering criteria over the identified time period satisfying the clustering criteria.

To address the network effect of the person-level viewing data, the example behavior-based program clustering system 105 includes an example program viewing adjuster 130. The program viewing adjuster 130 of the illustrated example adjusts the person-level viewing data to create person-level program viewing data representing viewing caused by interest in a given program, rather than being caused by the network effect. In some examples, the network effect is manifested through the lead-in and lead-out effects. For example, fans of National Football League (NFL) football games may tune to the CBS television network on Sunday evenings. When the football game is over, some of those viewers stay tuned to CBS to watch the program following the game, such as the program "60 Minutes." Conversely, fans of "60 Minutes" may tune in early and, thus, watch some of the NFL games. Furthermore, sporting events, such as football games, often run over time, so people who tuned to CBS at the regular starting time of "60 Minutes" may end up watching part of the football game while waiting for their desired program ("60 Minutes") to begin. (It should be noted that, in some examples, a modeler may adjust implementation of the behavior-based program clustering system 105 to balance how much to correct for the network effect versus how much to allow network effect to be expressed in the results in a manner that is appropriate for a given client's needs.)

To measure "true" program viewing, instead of network viewing, the example program viewing adjuster 130 adjusts the person-level viewing data using a model based upon the binomial proportion distribution. However, in other examples, one or more other models may be used to adjust the person-level viewing data. The binomial distribution is a statistical model for binary variables. For example, the program viewing adjuster 130 operates as follows. First, the program viewing adjuster 130 of the illustrated example determines, from the person-level viewing data obtained from the ratings determiner 110 or otherwise accessed, and the program data stored in and accessed from the program database 125, the following statistics for a given television program:

PR, which is the Program Rating (e.g., the probability a given person tuned to the given program, such as the fraction of time, relative to the total duration of the given program, the given person tuned to the given program), by unique person and program;

NR, which is the Network Rating (e.g., the probability a given person tuned to the given network broadcasting the given program, such as the fraction of time, relative to a monitoring interval (e.g., a viewing session, a day, etc.), the given person tuned to the given network broadcasting the given program), by unique person and network;

PB, which is the Program Broadcast time (e.g., duration in minutes), by unique program; and PV, which is the Program Viewing time (e.g., duration in minutes), by unique person and program.

Next, the program viewing adjuster 130 of the illustrated example calculates an example program-to-network ratio, PNR, based on the foregoing statistics. For example, the program viewing adjuster 130 can compute PNR according to the formula given in Equation 1:

$$PNR = \frac{(PR - NR)}{\sqrt{NR * (1 - NR)/PB}} \quad \text{Equation 1}$$

Thus, according to Equation 1, the program viewing adjuster 130 determines the ratio PNR for a given person tuning to a given program by determining a numerator value based on a difference between the program rating (PR) for the given person tuning to the given program and the network rating (NR) for the given person tuning to the given network corresponding to the given program. To determine the ratio PNR, the program viewing adjuster 130 also determines a denominator value based on the network rating (NR) for the given person tuning to the given network corresponding to the given program and the total duration of the given program (PB), Then, the program viewing adjuster 130 of the illustrated example compares the PNR determined for a given person and a given program to a threshold, represented by the variable THRESHOLD, to adjust the person level viewing data (PV) for the given person and the given program to account for the network effect. For example, the program viewing adjuster 130 can adjust PV for a given person and a given program according to the formula given in Equation 2:

$$\text{if PNR} \leq \text{THRESHOLD then PV=0; otherwise PV is unchanged} \quad \text{Equation 2}$$

Thus, according to Equation 2, the program viewing adjuster 130 adjusts the given person-level program viewing data (PV) for a given person having tuned to a given program by comparing the ratio PNR for the given person and program to a threshold, setting the person-level program viewing data (PV) equal to zero when the ratio PNR does not satisfy the threshold, and leaving the person-level program viewing data (PV) unchanged when the ratio PNR satisfies the threshold. In other words, for each person and each program viewed by the person, program viewing adjuster 130 of the illustrated example compares the person's program rating for the program to the person's corresponding network rating. If the program rating is relatively low, the program viewing is likely driven by network lead-in, network lead-out, and/or some other network-based factors. Thus, the example program viewing adjuster 130 adjusts the person's program viewing minutes to zero for programs having a low program-to-network ratio, PNR, as calculated according to Equations 1 and 2.

In some examples, the program viewing adjuster 130 determines the value of the THRESHOLD of Equations 2 as follows. The program viewing adjuster 130 initially sets the value of the THRESHOLD to an initial value, such as 5 or some other value. Then, the program viewing adjuster 130 of the illustrated example adjusts the value of the THRESHOLD using one or both of the following techniques: a technique based on the zero-inflated negative binomial model, and/or a technique based on heuristics.

For the technique based on the zero-inflated negative binomial (ZINB) model, the example program viewing adjuster 130 runs a ZINB model to estimate how much network behavior explains television viewing minutes. If the ZINB model indicates at least a specified or otherwise determined percentage (e.g., X %, such as 30%) of television viewing is caused by the network behavior, the example program viewing adjuster 130 raises the value of the THRESHOLD (e.g., to a value of 10 or some other value) until the specified or otherwise determined percentage (X %) of raw viewing minutes, PV, are removed.

For the technique based on heuristics, the example behavior-based program clustering system 105 runs one or more clustering model iterations, each with different THRESHOLD values. A human analyst then reviews the results and, based upon the analyst's domain knowledge, picks the corresponding THRESHOLD that gives the most intuitive results.

The example behavior-based program clustering system 105 includes an example program distance determiner 135 to determine distances between respective pairs of the programs to be clustered. The distances are used to group the televisions programs into different clusters. In the illustrated example, the distances determined by the program distance determiner 135 reflect how similar, or different, the viewing behavior is for the pairs of programs that are compares. For example, the program distance determiner 135 uses the adjusted program viewing minutes determined by the example program viewing adjuster 130 as the viewing behavior characteristics for determining the distances between pairs of television programs.

To measure the similarity between two items, a commonly used measurement is the Euclidean distance. However, the Euclidean distance is ill-suited for program viewing data because the values of the adjusted program viewing minutes (PV) is left-truncated at zero (with a lot of zero values). Thus, in the illustrated example, the program distance determiner 135 computes the Canberra distance to measure the dissimilarity between two programs. However, in other examples, one or more other distance computation techniques can be implemented by the program distance determiner 135 to measure the dissimilarity between two programs. The Canberra distance is designed to measure distances between characteristics having non-negative values (e.g., such as counts). The program distance determiner 135 computes the Canberra distance between two programs x and y according to the formula given in Equation 3:

$$\text{Canberra Distance}(x, y) = \sum_{i=1}^{I} \frac{|x_i - y_i|}{|x_i + y_i|} \qquad \text{Equation 3}$$

In Equation 3, the variable $i^{th}$ represents the $i^{th}$ person, the variable $x_i$ represents the adjusted program viewing minutes (PV) for the program x and the $i^{th}$ person, the variable $y_i$ represents the adjusted program viewing minutes (PV) for the program y and the $i^{th}$ person, and the summation is over the set of people, I, for which program viewing is available (e.g., and on which program clustering is to be based).

The example behavior-based program clustering system 105 also includes an example program clusterer 140 to cluster the television programs (e.g., identified for clustering, as described above) into different clusters based on the distances determined by the program distance determiner 135. The program clusterer 140 of the illustrated example implements a k-medoids model, which is a variation of the k-means model, to cluster the television programs based on the distances determined by the program distance determiner 135. However, in other examples, other cluster models can be implemented by the program clusterer 140 in addition to, or as an alternative to, the k-medoids model.

The example behavior-based program clustering system 105 further includes an example cluster number selector 145 to select the number of clusters into which the example program clusterer 140 is to cluster the television programs. Example techniques to select the number of clusters include, but are not limited to, techniques based on eigenvalues, a Scree plot, etc. However, the cluster number selector 145 of the illustrated example implements an improved technique for selecting the number of clusters, which is based on average silhouette width (ASW) as follows. The example cluster number selector 145 implements one or more of several example techniques as described below for selecting the final (e.g., optimal) number of clusters based on ASW. For each example cluster number selecting technique, ASW is calculated by executing the program clusterer 140 to perform program clustering using different possible numbers of clusters, k, in an acceptable range determined for the given technique and determining ASW for each number of clusters, k.

In some examples, the cluster number selector 145 uses a first example cluster number selection technique when ASW stops increasing while performing program clustering using different possible, increasing numbers of clusters, k, in an acceptable range. This first example technique selects the final (e.g., optimal) number of clusters, k, to be the value of k with the maximum ASW.

In some examples, the cluster number selector 145 uses a second example cluster number selection technique when ASW continues to increase while performing program clustering using different possible, increasing numbers of clusters, k, in an acceptable range. In some such second example techniques, the cluster number selector 145 selects the number of clusters to be the value of k in the acceptable range with the biggest jump in ASW. In some such examples, an index or ratio is used to identify whether the amount of increase in ASW is slowing down as the number of clusters is increased. In some such examples, to keep a balance between maximum compression of programs using a single cluster and maximum accuracy by assigning each program to its own cluster, the number of clusters, k, is increased at each clustering iteration with a penalty.

In some examples, the cluster number selector 145 computes ASW for a given clustered television program as follows. Silhouette width, sw, measures how well a given television program was clustered. Silhouette width, sw, can be computed according to the formula given by Equation 4:

$$sw(i) = \frac{(b(i) - a(i))}{\max(a(i), b(i))} \qquad \text{Equation 4}$$

In Equation 4, a(i) is the average distance of program i to all other programs in the same cluster. This variable represents the dissimilarity of program i from its cluster. The smaller the value of a(i) for a given program i, the better the program i fits in its own cluster. In Equation 4, b(i) is the minimum average distance of program i to any other cluster. The cluster with the lowest average distance is said to be "neighboring cluster" of program i. From Equation 4, silhouette width, sw, ranges from $-1 \leq sw(i) \leq 1$ Using the silhouette widths, sw, calculated for the different clustered programs, i, the cluster number selector 145 of the illustrated example computes ASW according to the formula given by Equation 5:

$$ASW(k) = \frac{\sum SW(i)}{n} \quad \text{Equation 5}$$

In Equation 5, $\Sigma SW(i)$ is the sum of silhouette widths for all of the clustered programs, k is the total number of clusters into which the programs have been grouped, and n is the number of clustered programs in the dataset. In the illustrated example, a larger value of ASW corresponds to a better overall program clustering.

As noted above, the cluster number selector 145 of the illustrated example uses a second example cluster number selection technique when ASW continues to increase while performing program clustering using different possible numbers of clusters, k, in an acceptable range. The second example cluster number selection technique can be implemented by the cluster number selector 145 as follows. First, the range of k (number of clusters) to test is identified. In some examples, the smallest value of k should be smaller than a desired minimum number of clusters (e.g., provided as a user input or otherwise specified). In some examples, the largest value of k depends on how many programs are in the dataset. For example, the largest value of k can be determined by dividing the total number of programs in the dataset by a constant value (C), such as the value 20, or some other value (e.g., provided as a user input or otherwise specified).

Then, the second example cluster number selection technique utilizes one or more approaches for the measuring changes in ASW as the value of k is increased for successive clustering iterations. In a first example approach, the final (e.g., optimal) number of clusters is the value of k with the largest value of Index as defined by Equation 6:

Index=ASW(k)×Penalty×Diff   Equation 6

In Equation 6, ASW(k) is the value of ASW when the number of clusters is k, Penalty is a penalty value calculated as min(number of programs/C,k) where C is the constant value described above (e.g., 20 or some other value), and Diff is a difference value calculated as ASW(k)–MA, where $$MA = \sum_{k-n}^{k+n} ASW(i)/(2n+1)$$

for given value of n. For example, when n=1, MA is the average of ASW(k−1), ASW(k) and ASW(k+1).

In a second example approach, the final (e.g., optimal) number of clusters is the value of k with the largest value of Index as defined by Equation 7:

Index=ASW(k)×Penalty×Diff   Equation 7

In Equation 7, ASW(k) is the value of ASW when the number of clusters is k, Penalty is a penalty value calculated as min(number of programs/C,k) where C is the constant value described above (e.g., 20 or some other value), and Diff is a different value calculated as ASW(k)–ASW(k+1).

In a third example approach, the final (e.g., optimal) number of clusters is the value of k when the amount of increase in ASW is slowing down as the number of clusters, k, increases. For example, this slowing down of the increase in ASW can be measured using Ratio as defined in Equation 8:

$$\text{Ratio} = \frac{PctIncreaseInASW}{Penalty} \quad \text{Equation 8}$$

In Equation 8, PctIncreaseInASW is a percentage increase in ASW calculated as (ASW(k)/ASW(a))−1, where a is the smallest value of k to be examined, and Penalty a penalty value is calculated as $\log_{10}(k)-\log_{10}(a)+1$, where a is the smallest value of k to be examined.

In some examples, the cluster number selector 145 may implement one or more techniques based on metrics in addition to, or other than, ASW to select the final number of clusters, and the corresponding final clustering solution. For example, the cluster number selector 145 may implement a technique based on a combination of ASW, network match rate and genre match rate to select the final number of clusters and the corresponding final clustering solution. In some examples, the network match rate is the percentage of programs in a given clustering solution that are associated with the most common network in the given clusters in which they are grouped. Similarly, the genre match rate is the percentage of programs in a given clustering solution that are associated with the most common genre in the given clusters in which they are grouped. For example, consider a 2-cluster solution in which the most common network and genre for the first cluster are "ABC" and "sitcom" respectively, and the most common network and genre for the second cluster are "NBC" and "sports" respectively. Also, assume that the first cluster includes 10 programs in which 4 of the programs are associated with the "ABC" network and 7 of the programs are associated with the "sitcom" genre. Furthermore, assume that the second cluster includes 15 programs in which 5 of the programs are associated with the "NBC" network and 9 of the programs are associated with the "sports" genre. In such an example, the network match rate and the genre match rate are calculated according to Equations 9 and 10, which are:

$$\text{Network Match Rate} = \frac{(4+5)}{(10+15)} = \frac{9}{25} = 36\% \quad \text{Equation 9}$$

$$\text{Genre Match Rate} = \frac{(7+9)}{(10+15)} = \frac{16}{25} = 64\% \quad \text{Equation 10}$$

In some such examples, the cluster number selector 145 maintains moving averages of the ASW, network match rate and genre match rate, and compares the ASW, network match rate and genre match rate to their respective moving averages. For example, ASW can be compared to the moving average of ASW using Equation 11, which is:

$$\text{ASW Comparison} = \frac{ASW}{\text{Moving Average of } ASW} \qquad \text{Equation 11}$$

In Equation 11, the moving average of ASW is calculated as the average of the ASWs of the 10 nearest potential clustering solutions (or some other number of nearest potential clustering solutions). In some examples, the cluster number selector 145 compares a ratio of the network match rate to the genre match rate to a corresponding ratio of the moving average of the network match rate to the moving average of the genre match rate. In some examples, the cluster number selector 145 then evaluates the resulting ASW comparison and the resulting network match rate and genre match rate comparison using any appropriate selection criterion or criteria to select the final number of clusters and the corresponding final clustering solution.

In some examples, the cluster number selector 145 may bias cluster selection to prefer high genre match rates relative to network match rates. Additionally or alternatively, the cluster number selector 145 may employ one or more other metrics to evaluate the quality of a given clustering solution.

In the illustrated example of FIG. 1, the behavior-based program clustering system 105 includes an example cluster reporter 150 to output cluster information describing the television program clusters determined by the example program clusterer 140 when configured to determine the number of clusters selected by the example cluster number selector 145. For example, the cluster reporter 150 can assign unique cluster identifiers for each cluster determined by the program clusterer 140 and associate the respective cluster identifier for a given cluster with the individual television programs included in that cluster. In some examples, the cluster reporter 150 can include cluster characteristics with a reported cluster, such as a number of programs included in the cluster, average adjusted PV for the programs in the cluster, range of adjusted PV values for the programs in the cluster, etc. The cluster reporter 150 of the illustrated example outputs the cluster information using any appropriate data format, messaging, display format, etc.

While an example manner of implementing the audience measurement system 100 is illustrated in FIG. 1, one or more of the elements, processes and/or devices illustrated in FIG. 1 may be combined, divided, re-arranged, omitted, eliminated and/or implemented in any other way. Further, the example behavior-based program clustering system 105, the example ratings determiner 110, the example panelist demographics database 115, the example panelist viewing database 120, the example program database 125, the example program viewing adjuster 130, the example program distance determiner 135, the example program clusterer 140, the example cluster number selector 145, the example cluster reporter 150 and/or, more generally, the example audience measurement system 100 of FIG. 1 may be implemented by hardware, software, firmware and/or any combination of hardware, software and/or firmware. Thus, for example, any of the example behavior-based program clustering system 105, the example ratings determiner 110, the example panelist demographics database 115, the example panelist viewing database 120, the example program database 125, the example program viewing adjuster 130, the example program distance determiner 135, the example program clusterer 140, the example cluster number selector 145, the example cluster reporter 150 and/or, more generally, the example audience measurement system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audience measurement system 100, the example behavior-based program clustering system 105, the example ratings determiner 110, the example panelist demographics database 115, the example panelist viewing database 120, the example program database 125, the example program viewing adjuster 130, the example program distance determiner 135, the example program clusterer 140, the example cluster number selector 145 and/or the example cluster reporter 150 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience measurement system 100 of FIG. 1 may include one or more elements, processes and/or devices in addition to, or instead of, those illustrated in FIG. 1, and/or may include more than one of any or all of the illustrated elements, processes and devices.

Figure 2:
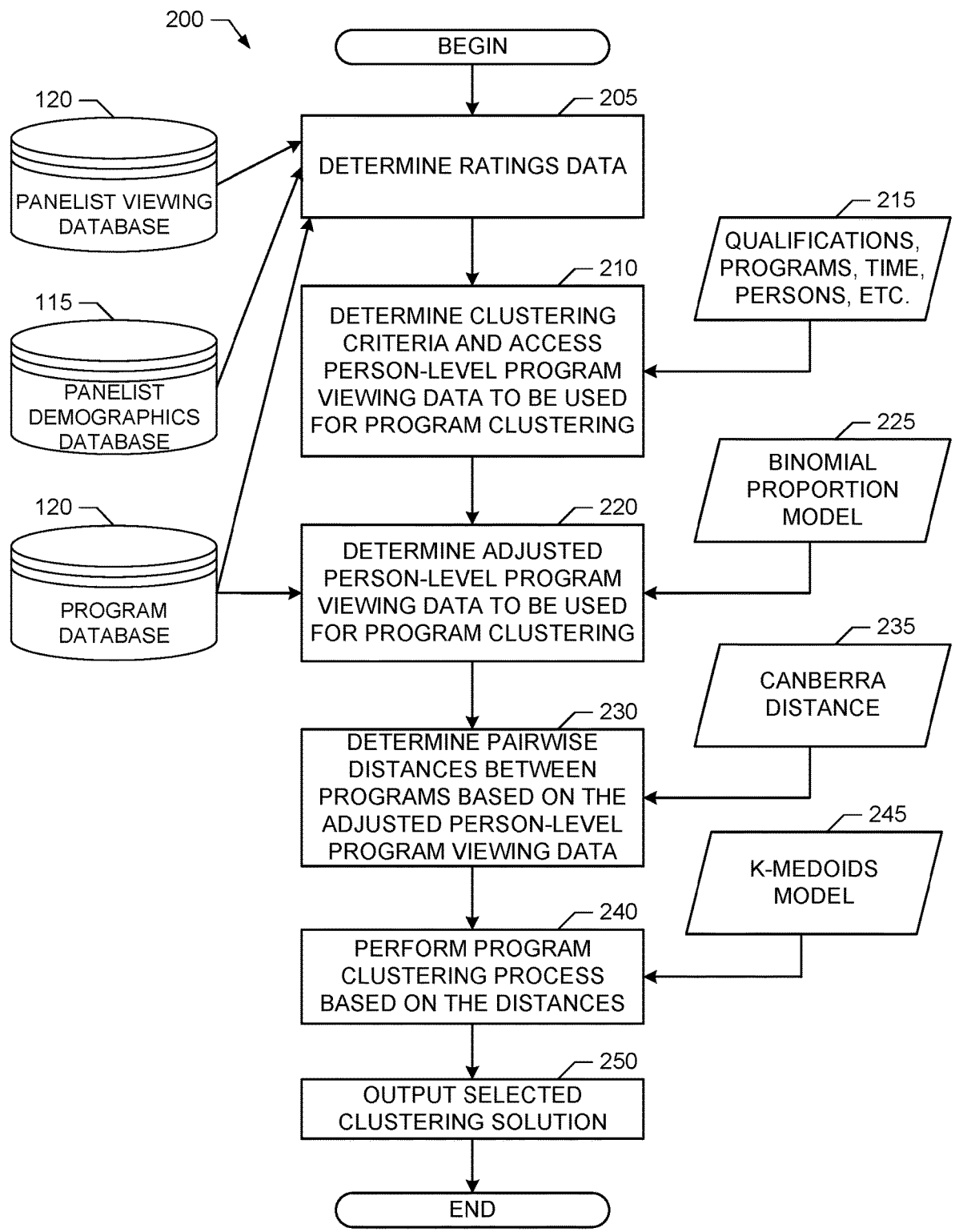
FIG. 2 is a flowchart representative of first example computer readable instructions that may be executed to implement the example behavior-based program clustering system of FIG. 1.
Figure 3:
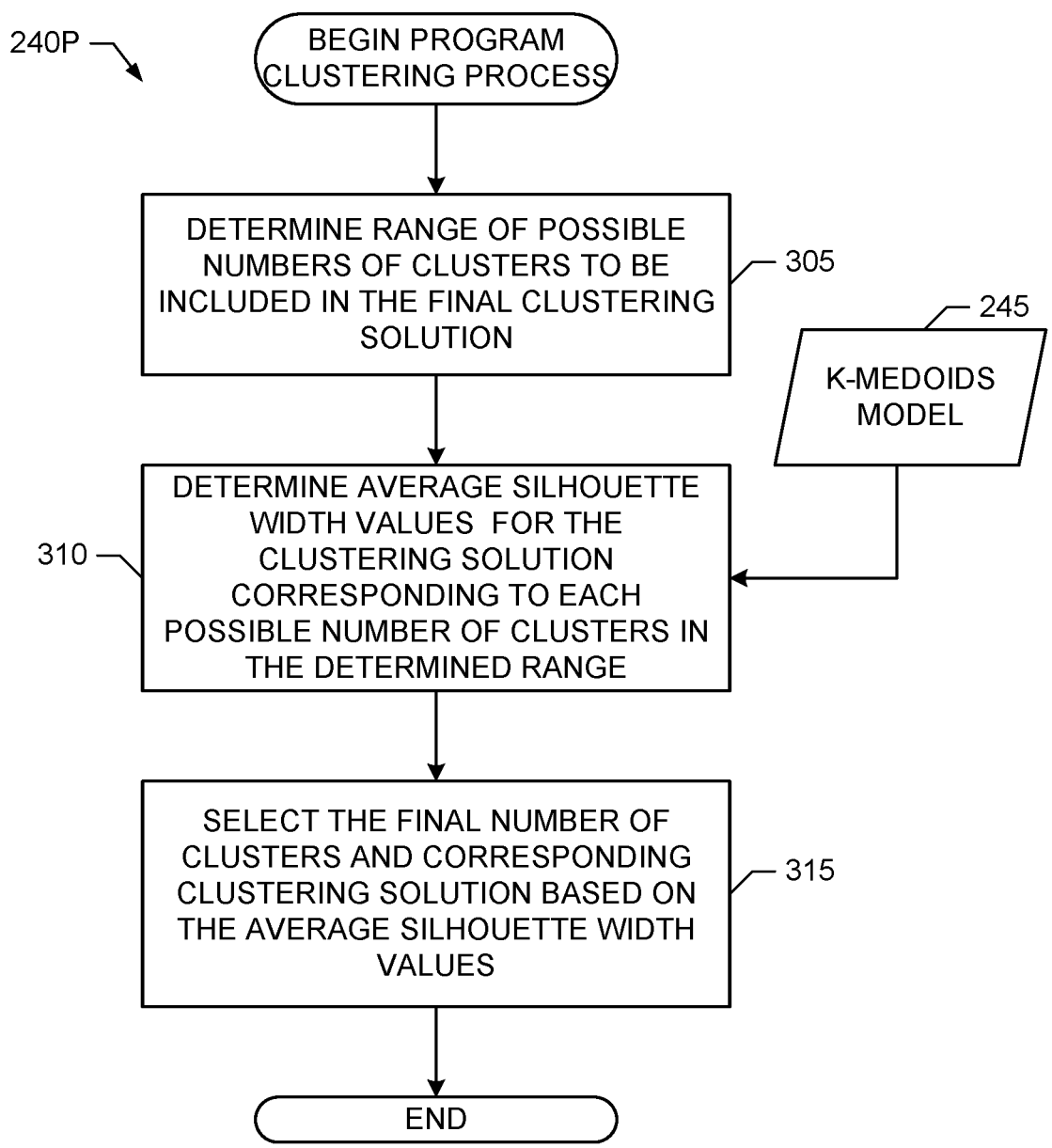
FIG. 3 is a flowchart representative of second example computer readable instructions that may be executed to implement the example behavior-based program clustering system of FIG. 1.

Flowcharts representative of example machine readable instructions for implementing the example audience measurement system 100, the example behavior-based program clustering system 105, the example ratings determiner 110, the example panelist demographics database 115, the example panelist viewing database 120, the example program database 125, the example program viewing adjuster 130, the example program distance determiner 135, the example program clusterer 140, the example cluster number selector 145 and/or the example cluster reporter 150 are shown in FIGS. 2-3. In these examples, the machine readable instructions comprise one or more programs for execution by a processor, such as the processor 412 shown in the example processor platform 400 discussed below in connection with FIG. 4. The one or more programs, or portion(s) thereof, may be embodied in software stored on a non-transitory computer readable storage medium such as a CD-ROM, a floppy disk, a hard drive, a digital versatile disk (DVD), a Blu-ray Disk™, or a memory associated with the processor 412, but the entire program or programs and/or portions thereof could alternatively be executed by a device other than the processor 412 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 2-3, many other methods of implementing the example audience measurement system 100, the example behavior-based program clustering system 105, the example ratings determiner 110, the example panelist demographics database 115, the example panelist viewing database 120, the example program database 125, the example program viewing adjuster 130, the example program distance determiner 135, the example program clusterer 140, the example cluster number selector 145 and/or the example cluster reporter 150 may alternatively be used. For example, with reference to the flowchart illustrated in FIG. 2, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 2-3 may be implemented using coded instructions (e.g., computer and/or machine readable instructions) stored on a non-transitory computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term non-transitory computer readable storage medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

A first example program 200 that may be executed to implement the audience measurement system 100 of FIG. 1 to cluster television programs in accordance with the teachings of this disclosure is represented by the flowchart shown in FIG. 2. With reference to the preceding figure and associated written description, the example program 200 of FIG. 2 begins execution at block 205 at which the example ratings determiner 110 of the audience measurement system 100 determines, as described above, television ratings data including person-level viewing data based on data obtained by the audience measurement system 100 and stored in one or more of the example panelist demographics database 115, the example panelist viewing database 120 and/or the example program database 125.

At block 210, the example behavior-based program clustering system 105 of the audience measurement system 100 identifies the television programs, time period, audience population, etc., and any other qualifications (e.g., clustering criteria) (represented as block 215 in FIG. 2) to set the scope of the television program clustering, as further described above. At block 220, the example program viewing adjuster 130 of the behavior-based program clustering system 105 adjusts, as described above, the person-level viewing data for each person and for each program to be clustered based on a binomial proportion model (represented as block 225 in FIG. 2). At block 230, the example program distance determiner 135 of the behavior-based program clustering system 105 determines the similarities between pairs of programs to be clustered by calculating, as described above, Canberra distances (represented as block 235 in FIG. 2) for respective pairs of programs. At block 240, the example program clusterer 140 of the behavior-based program clustering system 105 performs a clustering procedure, as described above, to cluster the television programs into different clusters based on the Canberra distances and using a k-medoids model (represented as block 245 in FIG. 2). An example program that may be executed to perform the processing at block 245 is illustrated in FIG. 3, which is described in further detail below. At block 250, the example cluster reporter 150 of the behavior-based program clustering system 105 outputs the final clustering solution selected based on the processing performed at block 240. Execution of the example program 200 then ends.

A second example program 240P that may be executed to implement the audience measurement system 100 of FIG. 1 to determine a final number of clusters and corresponding clustering solution into which television programs are to be clustered in accordance with the teachings of this disclosure is represented by the flowchart shown in FIG. 3. The example program 240P of FIG. 3 may be executed to perform the processing at block 240 of FIG. 2. With reference to the preceding figure and associated written description, the example program 240P of FIG. 3 begins execution at block 305 at which the example cluster number selector 145 determines, as described above, a range of possible numbers of clusters, k, into which the television programs are to be clustered. For example, the cluster number selector 145 can determine the range of possible numbers of clusters, k, from a smallest value corresponding to a user input or otherwise specified minimum number of clusters required to be in the clustering solution, and a largest value determined by dividing the total number of programs by a user input or otherwise specified value.

At block 310, the cluster number selector 145 determines, as described above, ASW values for the respective clustering solution corresponding to each one of the possible number of clusters included in the range determined at block 305. For example, the cluster number selector 145 can determine the ASW values according to Equations 4 and 5 described above. At block 315, the cluster number selector 145 selects the final number of clusters, and the corresponding clustering solution, based on the ASW values determined at block 310 for the different possible numbers of clusters. For example, the cluster number selector 145 can implement any of the techniques described above to evaluate the ASW values to select the final number of clusters.

Figure 4:
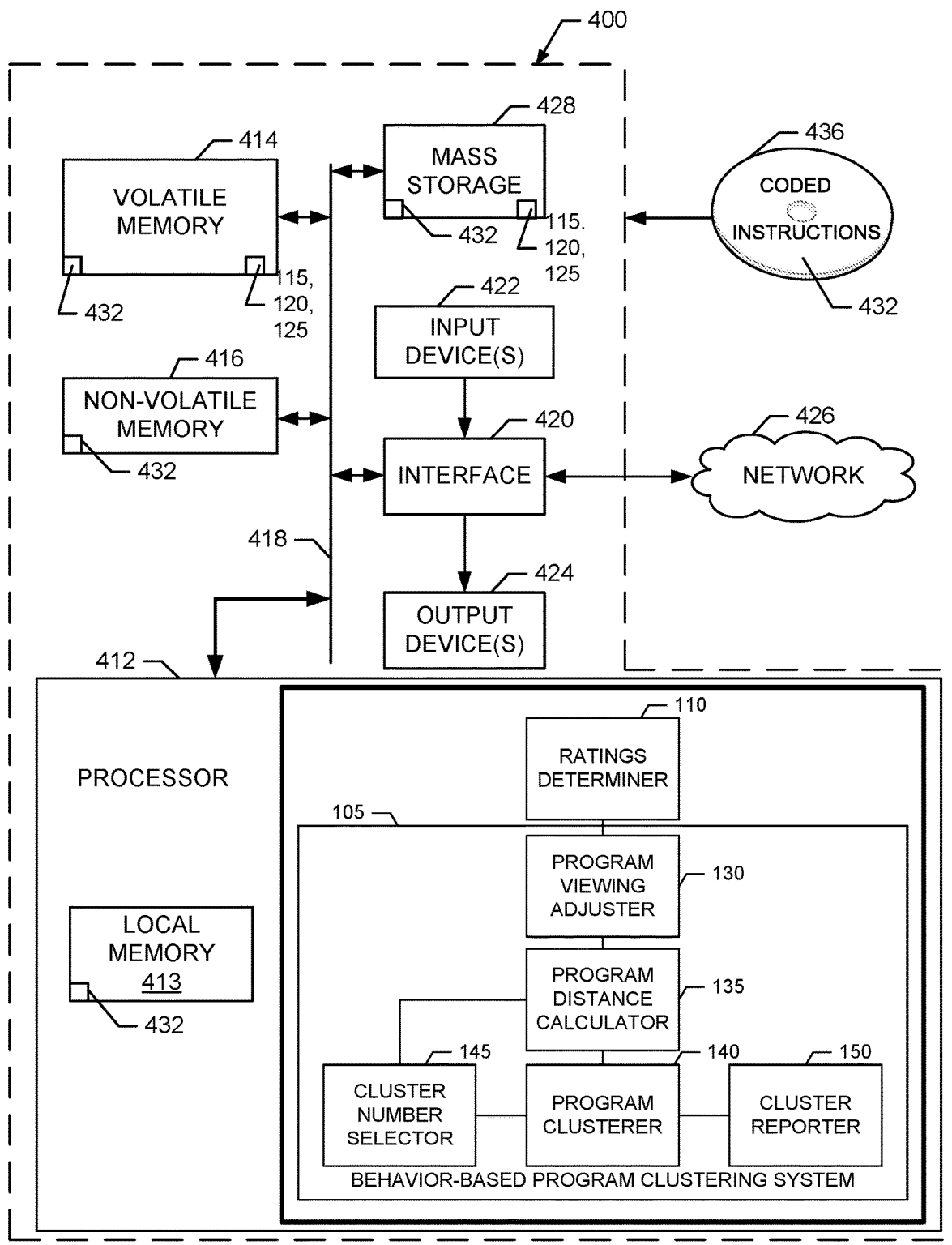
FIG. 4 is a block diagram of an example processor platform structured to execute the example computer readable instructions of FIGS. 2 and/or 3 to implement the example behavior-based program clustering system of FIG. 1.

FIG. 4 is a block diagram of an example processor platform 400 capable of executing the instructions of FIG. 2 to implement the example behavior-based program clustering system 105 and/or, more generally, the example audience measurement system 100 of FIG. 1. The processor platform 400 can be, for example, a server, a personal computer, a mobile device (e.g., a cell phone, a smart phone, a tablet such as an iPad™), a personal digital assistant (PDA), an Internet appliance, etc., or any other type of computing device.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer. In the illustrated example of FIG. 4, the processor 412 is configured via example instructions 432, which include the example instructions of FIGS. 2 and/or 3, to implement the example behavior-based program clustering system 105, the example ratings determiner 110, the example program database 125, the example program viewing adjuster 130, the example program distance determiner 135, the example program clusterer 140, the example cluster number selector 145 and/or the example cluster reporter 150 of FIG. 1.

The processor 412 of the illustrated example includes a local memory 413 (e.g., a cache). The processor 412 of the illustrated example is in communication with a main memory including a volatile memory 414 and a non-volatile memory 416 via a link 418. The link 418 may be implemented by a bus, one or more point-to-point connections, etc., or a combination thereof. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device (s) 422 permit(s) a user to enter data and commands into the processor 412. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 400, can allow the user to control the computer system and provide data to the computer using physical gestures, such as, but not limited to, hand or body movements, facial expressions, and face recognition.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID (redundant array of independent disks) systems, and digital versatile disk (DVD) drives. In some examples, the mass storage device 428 may implement the example panelist demographics database 115, the example panelist viewing database 120 and/or the example program database 125 of FIG. 1. Additionally or alternatively, in some examples, the volatile memory 414 may implement the example panelist demographics database 115, the example panelist viewing database 120 and/or the example program database 125 of FIG. 1.

Coded instructions 432 corresponding to the instructions of FIGS. 2 and/or 3 may be stored in the mass storage device 428, in the volatile memory 414, in the non-volatile memory 416, in the local memory 413 and/or on a removable tangible computer readable storage medium, such as a CD or DVD 436.

From the foregoing, it will be appreciated that example methods, apparatus and articles of manufacture have been disclosed that cluster television programs based on viewing behavior. Unlike prior program clustering approaches based on classifications provided by content provider, television program clustering as disclosed herein is based on viewing behavior of audience members. Example behavior-based program clustering techniques disclosed herein process person-level viewing data to account for network effects and other characteristics to achieve adjusted person-level viewing data that more accurately reflects durations of viewing given programs based on interest in the programs rather than interest in other programming broadcast before and/or after the given programs. Example behavior-based program clustering techniques disclosed herein then cluster television programs based on distances computed using the adjusted person-level viewing data. In this way, example behavior-based program clustering techniques disclosed herein cluster programs having similar viewing behavior among audience members, rather than based on pre-specified groupings set by content providers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    means for comparing (i) ratios of program ratings to corresponding network ratings with (ii) a threshold to determine adjusted viewing data for respective sites during a monitoring interval, the program ratings and the corresponding network ratings determined for programs tuned on corresponding networks at the respective sites during the monitoring interval, the adjusted viewing data for a combination of a first program and a first site to represent an adjusted amount of time the first program was presented at the first site;
    means for clustering the programs into program clusters based on distances between respective combinations of pairs of the programs, the distances based on the adjusted viewing data; and
    means for outputting information to identify the program clusters.

2. The apparatus of claim 1, wherein the combination of the first program and the first site is associated with a first one of the program ratings and a corresponding first one of the network ratings, and the means for comparing is to:
    set the adjusted amount of time in the adjusted viewing data for the combination of the first program and the first site to zero when a ratio of the first one of the program ratings to the corresponding first one of the network ratings is at least one of greater than or equal to the threshold; and
    set the adjusted amount of time in the adjusted viewing data for the combination of the first program and the first site to an amount of time the first program was presented at the first site when the ratio of the first one of the program ratings to the corresponding first one of the network ratings is less than the threshold.

3. The apparatus of claim 1, wherein the means for clustering is to cluster the programs into the program clusters based on (i) the distances between the respective combinations of pairs of the programs and (ii) at least one of a network match rate or a genre match rate exhibited by the program clusters.

4. The apparatus of claim 3, wherein the means for clustering is to cluster the programs into the program clusters based on a ratio of the network match rate to the genre match rate.

5. The apparatus of claim 1, wherein the means for outputting is to output characteristics of the program clusters, the characteristics including respective numbers of programs included in corresponding ones of the program clusters.

6. The apparatus of claim 5, wherein the characteristics further include respective average adjusted viewing data for the corresponding ones of the program clusters.

7. The apparatus of claim 1, wherein the means for outputting is to display the information to identify the program clusters according to a display format.

8. An apparatus comprising:
  means for adjusting person-level program viewing data to determine adjusted person-level program viewing data, the means for adjusting to:
    access respective person-level program viewing data that is to represent lengths of time respective people in an audience have tuned to respective ones of a plurality of television programs to be clustered; and
    determine the adjusted person-level program viewing data for respective ones of the people having tuned to respective ones of the television programs, first person-level program viewing data for a first one of the people having tuned to a first one of the programs to be adjusted based on a first ratio that is to characterize a relationship between (i) a first program rating associated with the first one of the people having tuned to the first one of the programs and (ii) a first network rating associated with the first one of the people having tuned to a first network associated with the first one of the programs, the first ratio based on division of a numerator value by a denominator value, the numerator value based on a difference between the first program rating and the first network rating, the denominator value based on the first network rating and a total duration of the first one of the programs; and
  means for clustering the ones of the plurality of television programs into clusters based on distances between pairs of the television programs, the distances based on the adjusted person-level program viewing data.

9. The apparatus of claim 8, wherein the first program rating corresponds to a fraction of time, relative to a total duration of the first one of the programs, during which the first one of the people tuned to the first one of the programs, and the first network rating corresponds to a fraction of time, relative to a monitoring interval, during which the first one of the people tuned to the first network.

10. The apparatus of claim 8, wherein the means for adjusting is to adjust the first person-level program viewing data for the first one of the people having tuned to the first one of the programs by:
  comparing the first ratio to a threshold;
  setting the first person-level program viewing data equal to zero when the first ratio does not satisfy the threshold; and
  leaving the first person-level program viewing data unchanged when the ratio satisfies the threshold.

11. The apparatus of claim 10, wherein the threshold is satisfied when the first ratio exceeds the threshold, and the threshold is not satisfied when the ratio does not exceed the threshold.

12. The apparatus of claim 8, further including means for selecting a final number of clusters into which the plurality of television programs is to be clustered, the final number of clusters to be selected based on average silhouette width values associated with clustering of the plurality of television programs into different possible numbers of clusters.

13. The apparatus of claim 12, wherein the means for selecting is to determine an average silhouette width value associated with the clustering of the plurality of television programs into a first possible number of clusters by:
  computing silhouette width values for respective ones of the plurality of television programs when the television programs are clustered into the first possible number of clusters, a silhouette width value for a first one of the television programs based on (1) an average distance of the first one of the television programs to other television programs in a same first cluster as the first one of the television programs, and (2) an average distance of the first one of the television programs to a neighboring cluster of the first cluster; and
  averaging the silhouette width values for the respective ones of the plurality of television programs when the television programs are clustered into the first possible number of clusters to determine the average silhouette width value for clustering the plurality of television programs into the first possible number of clusters.

14. An apparatus comprising:
  means for adjusting person-level program viewing data to determine adjusted person-level program viewing data, the means for adjusting to:
    access respective person-level program viewing data that is to represent lengths of time respective people in an audience have tuned to respective ones of a plurality of television programs to be clustered; and
    determine the adjusted person-level program viewing data for respective ones of the people having tuned to respective ones of the television programs, first person-level program viewing data for a first one of the people having tuned to a first one of the programs to be adjusted based on a first ratio that is to characterize a relationship between (i) a first program rating associated with the first one of the people having tuned to the first one of the programs and (ii) a first network rating associated with the first one of the people having tuned to a first network associated with the first one of the programs;
  means for clustering the ones of the plurality of television programs into clusters based on distances between pairs of the television programs, the distances to be based on the adjusted person-level program viewing data; and
  means for selecting a final number of clusters into which the plurality of television programs is to be clustered, the final number of clusters selected based on average silhouette width values associated with clustering of the plurality of television programs into different possible numbers of clusters.

15. The apparatus of claim 14, wherein the means for selecting is to determine an average silhouette width value associated with the clustering of the plurality of television programs into a first possible number of clusters by:
  computing silhouette width values for respective ones of the plurality of television programs when the television programs are clustered into the first possible number of clusters, a silhouette width value for a first one of the television programs based on (1) an average distance of the first one of the television programs to other television programs in a same first cluster as the first one of the television programs, and (2) an average distance of the first one of the television programs to a neighboring cluster of the first cluster; and averaging the silhouette width values for the respective ones of the plurality of television programs when the television programs are clustered into the first possible number of clusters to determine the average silhouette width value for clustering the plurality of television programs into the first possible number of clusters.

16. The apparatus of claim 14, wherein the first program rating corresponds to a fraction of time, relative to a total duration of the first one of the programs, during which the first one of the people tuned to the first one of the programs, and the first network rating corresponds to a fraction of time, relative to a monitoring interval, during which the first one of the people tuned to the first network.

17. The apparatus of claim 14, wherein the means for adjusting is to adjust the first person-level program viewing data for the first one of the people having tuned to the first one of the programs by:

comparing the first ratio to a threshold;

setting the first person-level program viewing data equal to zero when the ratio does not satisfy the threshold; and leaving the first person-level program viewing data unchanged when the ratio satisfies the threshold.

18. The apparatus of claim 17, wherein the threshold is satisfied when the ratio exceeds the threshold, and the threshold is not satisfied when the ratio does not exceed the threshold.

* * * * *